United States Patent
Chiu et al.

(10) Patent No.: US 7,668,092 B2
(45) Date of Patent: Feb. 23, 2010

(54) DATA TRANSMISSION SYSTEM AND METHOD

(75) Inventors: Victor Y. Chiu, Glendale, AZ (US); Scott R. Nagy, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1526 days.

(21) Appl. No.: 10/302,336

(22) Filed: Nov. 21, 2002

(65) Prior Publication Data

US 2004/0100989 A1 May 27, 2004

(51) Int. Cl.
*H04L 12/26* (2006.01)
*H04L 12/66* (2006.01)
*H04B 7/212* (2006.01)
*G06F 15/16* (2006.01)

(52) U.S. Cl. .................. 370/231; 370/252; 370/442; 370/463; 709/250

(58) Field of Classification Search ................ 370/231, 370/252, 442, 463; 709/250
See application file for complete search history.

(56) References Cited

U.S. PATENT DOCUMENTS

| | | | | |
|---|---|---|---|---|
| 4,663,757 A | * | 5/1987 | Huang et al. | 370/447 |
| 4,694,453 A | | 9/1987 | Kobayashi et al. | |
| 4,811,338 A | * | 3/1989 | Haruyama et al. | 370/462 |
| 5,317,571 A | * | 5/1994 | Marcel et al. | 370/508 |
| 5,519,689 A | * | 5/1996 | Kim | 370/232 |
| 5,559,796 A | * | 9/1996 | Edem et al. | 370/412 |
| 5,566,180 A | * | 10/1996 | Eidson et al. | 370/473 |
| 5,689,507 A | * | 11/1997 | Bloks et al. | 370/389 |
| 5,727,149 A | * | 3/1998 | Hirata et al. | 709/250 |
| 5,923,902 A | * | 7/1999 | Inagaki | 710/58 |
| 5,982,778 A | * | 11/1999 | Mangin et al. | 370/445 |
| 6,038,216 A | * | 3/2000 | Packer | 370/231 |
| 6,044,091 A | * | 3/2000 | Kim | 370/508 |
| 6,160,806 A | * | 12/2000 | Cantwell et al. | 370/360 |
| 6,161,160 A | * | 12/2000 | Niu et al. | 710/310 |
| 6,215,797 B1 | * | 4/2001 | Fellman et al. | 370/503 |
| 6,246,702 B1 | * | 6/2001 | Fellman et al. | 370/503 |
| 6,279,044 B1 | * | 8/2001 | Niu et al. | 710/5 |
| 6,298,041 B1 | * | 10/2001 | Packer | 370/231 |

(Continued)

FOREIGN PATENT DOCUMENTS

EP     0334569 A    9/1989

(Continued)

*Primary Examiner*—Alpus H Hsu
(74) *Attorney, Agent, or Firm*—Fogg & Powers LLC (57) ABSTRACT

A network interface mechanism and method is provided that facilitates precise transmission time control in a computer network. The network interface mechanism and method uses feedback to provide monitoring and precise control of the transmission time. Specifically, a message detector is provided that monitors the network for transmissions from the network interface mechanism. The arrival time of messages is compared to the desired transmission time, and the transmission time of subsequent transmissions is adjusted accordingly. A transmission disable mechanism is used in the forward path to disable the transmission driver at the transmission cut off time as a means to prevent the transmission node from babbling the media. Thus, the network interface mechanism and method provide precise control of the transmission time, and thus can be used to eliminate collisions in the network. The network interface mechanism and method allows the application of Ethernet controller to have precise transmission timing control in a computer network.

19 Claims, 3 Drawing Sheets

U.S. PATENT DOCUMENTS

| | | | |
|---|---|---|---|
| 6,374,405 B1 * | 4/2002 | Willard | 725/94 |
| 6,381,214 B1 * | 4/2002 | Prasad | 370/230.1 |
| 6,526,070 B1 * | 2/2003 | Bernath et al. | 370/509 |
| 6,553,040 B2 * | 4/2003 | Bernath et al. | 370/509 |
| 6,556,591 B2 * | 4/2003 | Bernath et al. | 370/509 |
| 6,560,648 B1 * | 5/2003 | Dunn et al. | 709/224 |
| 6,563,796 B1 * | 5/2003 | Saito | 370/252 |
| 6,661,804 B2 * | 12/2003 | Fellman et al. | 370/420 |
| 6,674,730 B1 * | 1/2004 | Moerder | 370/316 |
| 6,741,563 B2 * | 5/2004 | Packer | 370/231 |
| 6,801,505 B1 * | 10/2004 | Cognet | 370/252 |
| 6,816,510 B1 * | 11/2004 | Banerjee | 370/503 |
| 6,822,974 B1 * | 11/2004 | Vaidya | 370/512 |
| 6,862,272 B2 * | 3/2005 | Dulin et al. | 370/330 |
| 6,928,052 B2 * | 8/2005 | Packer | 370/231 |
| 7,058,020 B2 * | 6/2006 | Tavana et al. | 370/252 |
| 7,099,354 B2 * | 8/2006 | Keating | 370/519 |
| 7,142,553 B1 * | 11/2006 | Ojard et al. | 370/421 |
| 7,289,538 B1 * | 10/2007 | Paradise et al. | 370/497 |
| 7,346,698 B2 * | 3/2008 | Hannaway | 709/231 |
| 2003/0007466 A1 * | 1/2003 | Chen | 370/328 |
| 2003/0185210 A1 * | 10/2003 | McCormack | 370/392 |

FOREIGN PATENT DOCUMENTS

EP  0911993 A  4/1999

* cited by examiner

FIG. 3

# DATA TRANSMISSION SYSTEM AND METHOD

FIELD OF THE INVENTION

This invention generally relates to electronic systems, and more specifically relates to distributed electronic systems.

BACKGROUND OF THE INVENTION

Modern life is becoming more dependent upon electronic systems. Electronics devices have evolved into extremely sophisticated devices, and may be found in many different applications. As electronics become more integrated into daily life, their ability to communicate and work together becomes a greater and greater necessity.

Computer devices commonly communicate through networks. These networks can take many shapes and forms. Different network systems communicate with different standards and protocols. One such popular standard is the IEEE 802.3 Ethernet standard. The Ethernet standard provides a low cost-high speed data communication with controllers that are available from a wide range of suppliers. This makes Ethernet controllers a desirable component in high volume communication products.

Unfortunately, there are some limitations in the Ethernet protocols and controllers that limits its applicability. For example, Ethernet controllers use a carrier sense medium access/collision detection mechanism which permits all nodes to access the media. Any node on the network can attempt to contend for the channel by waiting for a predetermined time after the last activity before transmitting on the media. If two nodes simultaneously contend for a channel, the signal will interact and potentially cause a loss of data. This event, called a collision, causes the Ethernet controller to retransmit after a random time period.

Typically, an on-chip buffer is used to store the message until the message can be transmitted again. The controller attempts to transmit when the buffer is filled and the medium is quiet. When there is contention, the controller continues to attempt to transmit the message until it can be done without causing a collision.

While this method is generally very effective, it does have some limitations. One limitation is that it does not allow individual nodes to have precise timing control over its time of transmission. This generally limits bandwidth and makes the Ethernet controller unacceptable for applications that require tight timing control.

For a real time communication system, it is critical for the transmitting node to transmit its message within a tight timing tolerance and no babbling is allowed to interfere with any other node's transmission ability. These criterion are manifested in real time communication protocols such as TDMA (Time Division Multiplexing Access) protocol.

The TDMA protocol requires each node connected to the medium to transmit at a specific non-overlapping time slot to ensure no message collision on the media. Each node has a transmission schedule relative to a global time reference. Once the nodes accomplish synchronization with the global time reference, each node uses the transmission schedule to transmit at its prescribed time slot. This requires tight transmission timing control to ensure transmission starts and completes within its assigned time slot. Additional measures are necessary to prevent a node from "babbling" the media when it is not scheduled to transmit message. The transmission timing control must be tight to better utilize available bandwidth and meet hard real time communication requirements.

Currently, no solutions exist that allow the use of a commonly available Ethernet controller in systems that require tight timing control or protection from "babbling". Thus, what is needed is an improved system and method for network communication that gives improved timing control to provide a high performance real time transmission system.

BRIEF SUMMARY OF THE INVENTION

The present invention provides a network interface mechanism and method that provides for precise transmission time control in a computer network. The network interface mechanism and method uses feedback to provide monitoring and precise control of the transmission time. Specifically, a message detector is provided that monitors the network for transmissions from the network interface mechanism. The arrival time of the transmitted messages is compared to the desired transmission time, and the transmission time of subsequent transmissions is adjusted accordingly. A transmission disable mechanism is used in the forward path to disable the transmitter at the transmission cut off time as a mechanism to prevent the transmission node from babbling the media. Thus, the network interface mechanism and method provide precise control of the transmission time, and are used to eliminate collisions in the network and allow the application of the Ethernet controller in real time communication protocols such as TDMA.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a network interface mechanism and method that provides for precise transmission time control in a computer network. The network interface mechanism and method uses feedback to provide monitoring and precise control of the transmission time. Specifically, a message detector is provided that monitors the network for transmissions from the network interface mechanism. The arrival time of messages is compared to the desired transmission time, and the transmission time of subsequent transmissions is adjusted accordingly. A transmission disable mechanism is used in the forward path to disable the transmitter at the transmission cut off time as a mechanism to prevent the transmission node from babbling the media. Thus, the network interface mechanism and method provide precise control of the transmission time, and are used to eliminate collisions in the network.

The present invention can be used to provide a time division multiplexed bus system. In a time division multiplexed access (TDMA) bus system, each device on the network transmits on the bus within a specified time slot. This allows multiple devices to share a network bus while minimizing the collisions that occur when multiple devices attempt to transmit at the same time. In TDMA systems, precise time control is needed to assure that different nodes do not to transmit in slots that are assigned to another node. The network interface mechanism and method of the present invention can be used to provide the tight timing control needed to efficiently implement a TDMA bus system.

In one embodiment of the present invention, the network interface mechanism is implemented using an Ethernet controller. Ethernet controllers are commonly used network devices that provide low cost-high speed data communication and are available from a wide range of suppliers. This makes Ethernet controllers a desirable component in high volume communication products. Unfortunately, Ethernet controllers do not provide the tight timing control needed to efficiently implement a TDMA or other real time bus system. In one embodiment of the present invention, an Ethernet controller is combined with a message detector provided to monitor the arrival time of messages. The arrival time of messages is compared to the desired transmission time, and the transmission time of subsequent transmissions from the Ethernet controller is adjusted accordingly. A transmission disable mechanism is used in the forward path to disable the transmitter at the transmission cut off time as a mechanism to prevent the transmission node from babbling the media. Thus, the embodiment provides precise control of the transmission time while using widely available Ethernet controllers.

Figure 1:
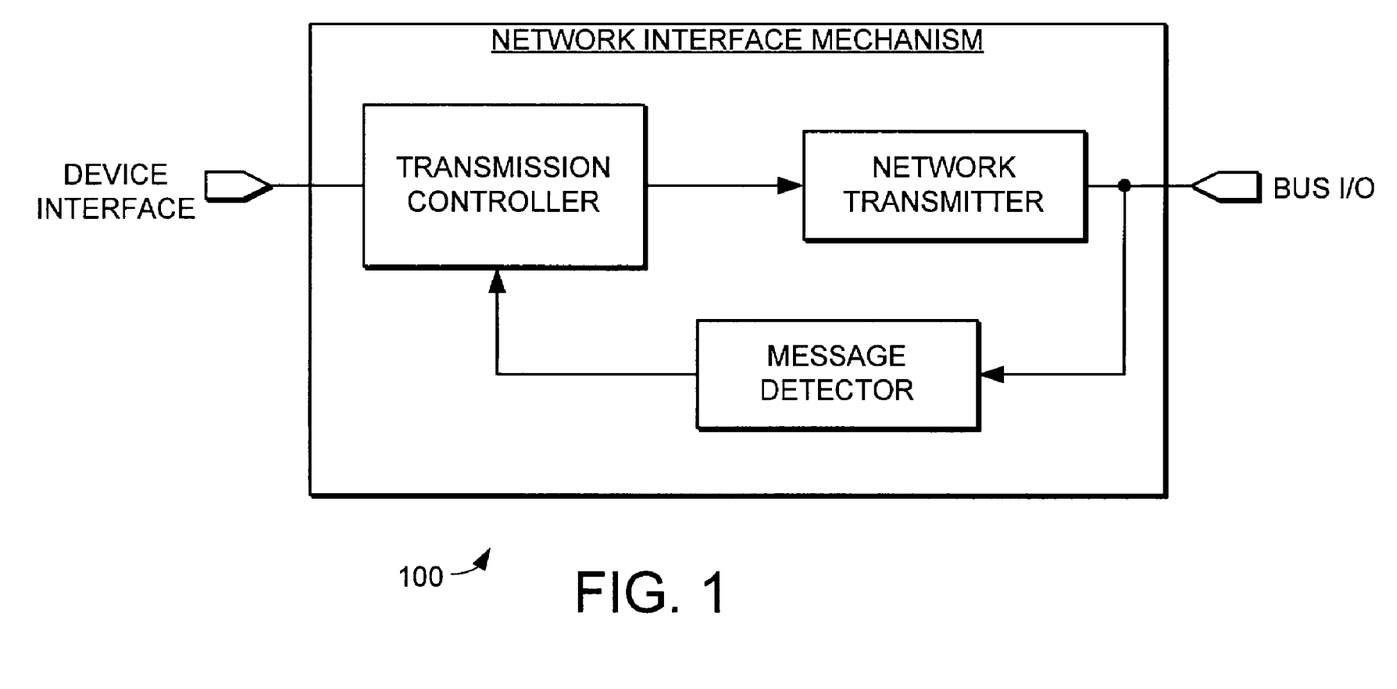
FIG. 1 is a schematic view of a network interface mechanism.

Turning now to FIG. 1, a network interface mechanism 100 is illustrated schematically. The network interface mechanism 100 includes a transmission controller, a network transmitter, and a message detector. The network interface mechanism 100 uses feedback to provide for precise transmission time control. Specifically, a message detector is provided that monitors the network for transmissions from the network interface mechanism 100. The transmission controller compares the arrival time of messages to the desired transmission time, and adjusts the transmission time of subsequent transmissions from the network transmitter accordingly and disables the transmitter at the transmission cut off time.

In one implementation, a transmission compensation value is computed from the comparison of the message arrival time and the desired transmission time. The transmission compensation value is used to adjust the next scheduled transmission time in the transmission controller. The next transmission of the network transmitter is then made at the adjusted transmission time.

The network interface mechanism 100 provides for tight transmission control and can thus be used to facilitate a TDMA bus system or other real time bus system. Specifically, the tight transmission control can be used to assure that each network device transmits only in its assigned time slot, thus facilitating a TDMA bus system.

Figure 2:
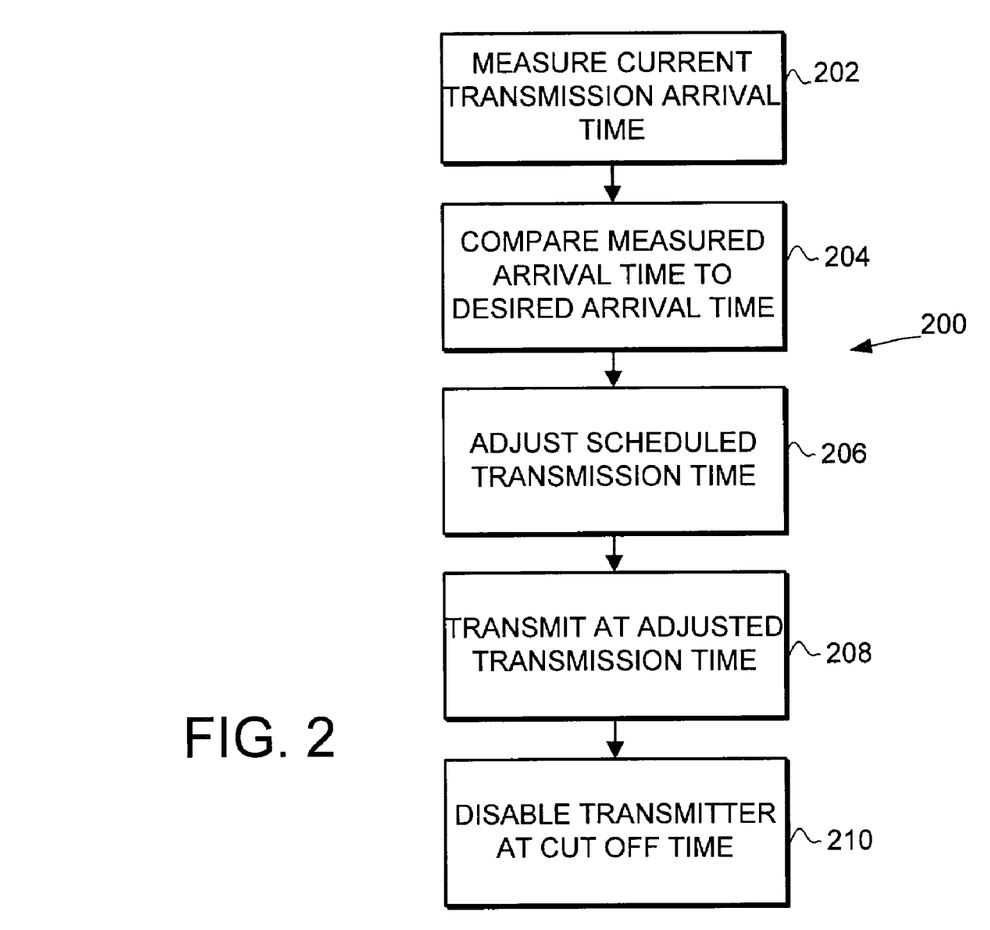
FIG. 2 is a flow diagram of a method for transmitting data on a network.

Turning now to FIG. 2, a method 200 for controlling network transmissions is illustrated. The method 200 can be used to provide the tight transmission time control needed to facilitate a TDMA bus system. Preferably, method 200 is performed each time an appropriate message is received. This allows the method to constantly adjust transmission schedules to facilitate precise timing control of transmission times.

The first step 202 in the method 200 is measure a current transmission arrival time for a first message, where the first message is any message that is to be used to adjust the transmission time of any subsequent message. The current transmission arrival time can be measured using any suitable method. For example, a detector can be used that latches the arrival time of a message when a message of a desired format is received.

The next step 204 is to compare the measured transmission arrival time to a desired arrival time. In this step, the time that the message was received is compared to the desired arrival time. From this step, the transmission timing error can be determined from the message arrival time.

The next step 206 is to adjust the scheduled transmission time. With the amount of transmission timing error in the arrival time of the current message determined, the transmission schedule for future transmissions can be adjusted to reduce and/or eliminate the error. If the measured arrival time of the message was late, the scheduled transmission time for the next message can be adjusted to send that message earlier. Likewise, if the measured arrival time of the message was early, the scheduled transmission time for the next message can be adjusted to send that message later.

The next step 208 is to transmit a subsequent message at the adjusted transmission time. It should be clear that the subsequent message can be any message that follows the first message. Thus, the subsequent message is transmitted at a time that compensates for previously measured errors in message reception time. This results in a precise time control for the transmission of the next message. The next step 210 is to disable the transmitter at the transmission cut off time. This prevents the transmitter from continuing transmission into the next time slot, and thus prevents collisions between transmissions. Again, as method 200 is preferably performed each time an appropriate message is received, method 200 constantly measures the arrival time messages and adjusts scheduled transmission times for subsequent messages, facilitating precise timing control. This can be used to implement bus systems that require precise timing control, such as TDMA systems that require each device to transmit in its own time slot.

Figure 3:
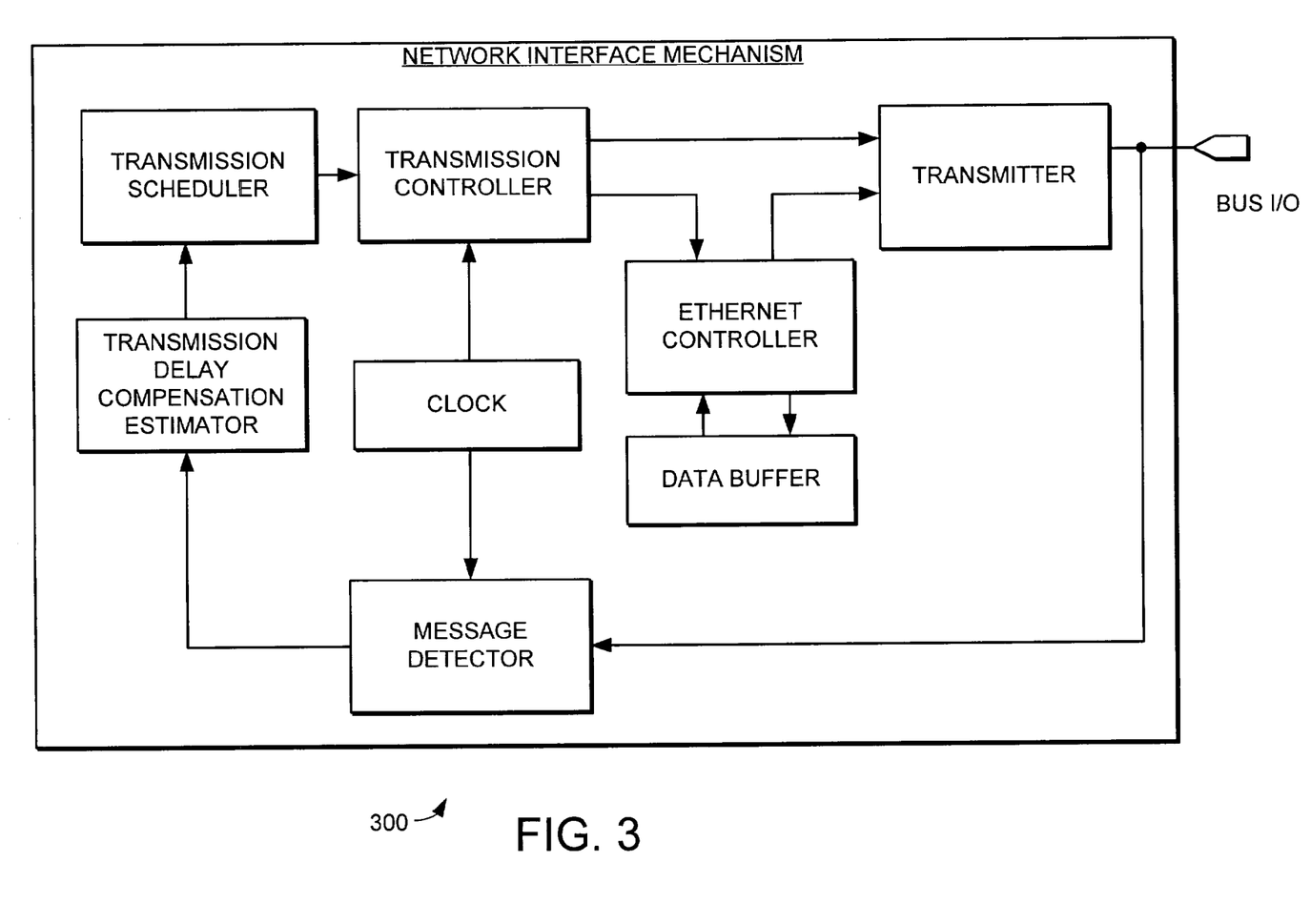
FIG. 3 a schematic view of a second embodiment network interface mechanism.

Turning now to FIG. 3, a schematic view of network interface mechanism 300 is illustrated. In this embodiment of the present invention, the network interface mechanism is implemented using an Ethernet controller. Ethernet controllers are common used network devices that provide low cost-high speed data communication and are available from a wide range of suppliers. This makes Ethernet controllers a desirable component in high volume communication products. Unfortunately, Ethernet controllers do not provide the tight timing control needed to efficiently implement a TDMA bus system. In the embodiment of FIG. 3, an Ethernet controller is combined with a message detector provided to monitor the arrival time of messages. The arrival time of each message is compared to the desired transmission time, and the transmission time and cut off time of subsequent transmissions from the Ethernet controller are adjusted accordingly. Thus, this embodiment provides precise control of the transmission time while using widely available Ethernet controllers.

The network interface mechanism 300 includes a transmitter, a transmission scheduler, a transmission controller, an Ethernet controller, a data buffer, a clock, a message detector, and a transmission delay compensation estimator. The network interface mechanism 300 includes a forward path comprising the transmission scheduler, transmission controller, Ethernet controller, data buffer and transmitter. The network interface mechanism 300 also includes a feedback path that includes the message detector and the transmission delay compensation estimator.

In general, the transmission controller controls the operation of the network interface mechanism by reading the transmission schedule from the transmission scheduler and selectively enabling and disabling the transmitter and Ethernet controller. When enabled, the Ethernet controller and transmitter deliver data from the data buffer to the bus I/O. Thus, the transmission controller operates to ensure that the network interface mechanism transmits in its scheduled time slots. The message detector latches message arrival time, which is passed to the transmission time compensation estimator. The transmission time compensation estimator uses the latched arrival time of the transmitted message to compute an estimated delay time and adjust the transmission schedule in the transmission scheduler with the estimated delay time. This compensates the transmission schedule for any delays in transmission, resulting in precise control of transmission times.

The transmission controller enables the transmitter and commands the Ethernet controller to initiate message content transfer from the data buffer to the Ethernet controller's transmit buffer when the transmission time clock reaches the adjusted transmission start time. Once the Ethernet controller's transmit buffer is filled up to a pre-determined value, the Ethernet controller starts sends the message content to the transmitter. When the transmitter is enabled, it converts messages from the Ethernet controller to the proper electrical signal format and transmits these electrical signals on the bus.

Because the Ethernet controller in the transmission system does not start initiation of data transfer from the data buffer until commanded by the transmission controller, it allows data to be loaded into the data buffer at any time prior to the actual transmission. This reduces critical timing requirements on message content loading into the data buffer.

For a TDMA implementation, each node in the network will transmit at a pre-allocated slot time that does not overlap with other node's transmission times. Once the nodes are synchronized, the bus will be free of other traffic when the transmission controller commands the Ethernet controller to initiate transmission. Since the bus is quiet, the Ethernet controller will be able to transmit the message successfully on the wire at the adjusted transmission time without the possibility of a collision. In addition, the transmission controller disables the transmitter when the transmission time clock reaches the programmed transmission cut off time. This prevents any unintended transmission to occur beyond the allocated transmission time slot (babbling).

During operation, the transmission scheduler reads the scheduled start time and adjusts it with a computed transmission delay compensation value computed by the transmission delay compensation estimator. The transmission scheduler also computes transmission cut off time based on the length of the message and the transmission start time.

The computed transmission start and cut off time values are loaded into the transmission controller. The transmission controller can include a TXFIFO (Transmission Control First In First Out Control Buffer). When the clock reaches the transmission start time value in the transmission controller, the transmission controller sends a command to the Ethernet controller to initiate data transfer from the data buffer to the Ethernet controller's transmit buffer. The transmission controller also sends a command to the transmitter to enable the transmitter.

When the Ethernet controller's transmit buffer is filled up to a pre-determined number of byte of data, the Ethernet controller starts sending its transmit buffer data content to the transmitter. When enabled by the transmission controller, the transmitter converts data from the Ethernet controller transmit buffer to a medium compatible electrical signal format and transmits it on the BUS I/O.

When the clock reaches the transmission cut off time, the transmission controller disables the transmitter. This mechanism ensures that no transmission occurs after the expiration of the allocated time slot.

The message detector detects the message transmission and latches the message transmission time in the form of a time stamp. The transmission delay compensation estimator compares the time stamp value against the transmission start time value in the transmission schedule to derive a measured transmission delay for the current transmission.

The transmission delay compensation estimator then generates a transmission delay compensation value for the next transmission. The delay compensation value is passed to the transmission scheduler where it is added to the next message's scheduled transmission start time. The delay compensation value is also added to the next transmission's cut off time based on the next message's transmission start time and message length. The adjusted transmission start and cut off times are then loaded into the transmission controller for the next transmission. Through this manner, the network interface mechanism is configured as a closed loop transmission control system.

The feedback loop provides an adjusted transmission start time that compensates for any forward path transport delay as well as any transmission time inaccuracy due to component parameter tolerance limits. As a result, each network interface mechanism can reliably transmit in its scheduled time slot.

Additionally, because the transmission controller disables the transmitter at the cut off time, it is assured that no transmission will occur beyond the pre-allocated time slot, and thus prevents a node from "babbling" the media.

It should be noted that the various elements in the network interface mechanism can be implemented in many different ways. For example, the transmission controller, transmission scheduler and transmission delay compensation estimator can be implemented as part of a microprocessor that is also used to load message data into the data buffer.

In one embodiment, the message detector includes a preamble detector, a message type detector and a time stamp register. The preamble detector is used to determine when the first seven bits of an Ethernet message format has been received. The message type detector is used to ensure that the message is of the transmitted message type, and the time stamp register is used to latch the time of arrival of the Ethernet message. The message type detector is to ensure that the latched time stamp is from a transmitted message of the correct type. For example, in some cases it is desirable to ensure that the message detector only detects multicast messages. The preamble detector ensures that a common time reference event is used for all transmitted messages, ensuring that all message detectors latch at the same time in the transmission.

The transmission delay compensation estimator can use many different methods to determine the compensation value that will be used to adjust the next scheduled transmission time. In one embodiment, the transmission delay compensation estimator weights the measured transmission delay in the current transmission and adds another weighted value of the previous frame's transmission delay compensation to generate a transmission delay compensation value for the next transmission. The delay compensation value is passed to the transmission scheduler where it is added to the next message's scheduled transmission start time. In this embodiment, the transmission delay compensation value for the next message $T_{delay}(n+1)$ can then be determined according to Equation 1.

$$T'_{delay}(n+1)=K(n)*T_{delay}(n)+(1-K)(n))*T_{error}(n) \quad \text{Equation 1}$$

Where n is an index indicating the current message, and where $T'_{delay}(n+1)$ is the estimated delay for the next message, $T_{delay}(n)$ was the estimated delay used for the current message, and $T_{error}(n)$ was the delay measured by the message detector for the current message. The value $K(n)$ is a blending factor to blend $T_{error}(n)$ and $T_{delay}(n)$ to generate an estimate of the next transmission's delay $T'_{delay}(n+1)$, and is defined as $$K(n)=(n-1)/n \quad \text{Equation 2}$$

When n is less than a constant C, and $$K(n)=(C-1)/C \quad \text{Equation 3}$$

When n is greater than the constant C. The constant C is preferably selected based upon performance considerations. In particular, C is selected based on how fast it is desired that the estimator come up with a steady state result and the desired accuracy of the estimate.

With the estimated delay for the next message computed, the transmission time for the next message can be computed according to Equation 4.

$$T_{transmit}(n+1)=T_{scheduled}(n+1)+T'_{delay}(n+1) \quad \text{Equation 4}$$

Where $T_{transmit}(n+1)$ is the adjusted transmit time for the next message, $T_{scheduled}(n+1)$ was the scheduled transmit time for the next message, and $T'_{delay}(n+1)$ is the estimated delay for the next message computed above. The computed adjusted transmit time for the next message can then be passed to transmission controller as the next message's transmission start time.

The feedback mechanism thus compensates for any hardware and/or software component parameter tolerance limit effects across the data bus network as well as the transmission system's forward path transport delay.

The present invention thus provides a network interface mechanism and method that provides for precise transmission time control in a computer network. The network interface mechanism and method uses feedback to provide monitoring and precise control of the transmission time. Specifically, a message detector is provided that monitors the network for transmissions from the network interface mechanism. The arrival time of messages is compared to the desired transmission time, and the transmission time of subsequent transmissions is adjusted accordingly. Thus, the network interface mechanism and method provide precise control of the transmission time, and thus can be used to eliminate collisions in the network.

The present invention can be used to provide a TDMA or other real time bus system. In a TDMA bus systems, each device on the network transmits on the bus within a specified time slot. This allows multiple devices to share a network bus while minimizing the collisions that occur when multiple devices attempt to transmit at the same time. In TDMA systems, precise time control is needed to assure that different nodes to not transmit in slots that are assigned to other devices. The network interface mechanism and method of the present invention can be used to provide the tight timing control needed to efficiently implement a TDMA bus system.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A network interface mechanism comprising:
   a) a network transmitter, the network transmitter transmitting a first message on a bus;
   b) a message detector, the message detector receiving the first message transmitted by the network transmitter and determining an arrival time of a feedback signal signifying the transmitted time instance of the first message; and
   c) a transmission controller, the transmission controller controlling the network transmitter to adjust a transmission time of a subsequent message on the bus in response to the determined arrival time of the feedback signal.

2. The network interface mechanism of claim 1 further comprising an Ethernet controller, the Ethernet controller passing data for the message to the network transmitter when enabled by the transmission controller.

3. The network interface mechanism of claim 1 further comprising a transmission scheduler, the transmission scheduler including a transmission schedule for the network interface mechanism.

4. The network interface mechanism of claim 1 further comprising a transmission delay compensation estimator, the transmission delay compensation estimator receiving the arrival time of the feedback signal from the message detector and determining a transmission time compensation value for adjusting the transmission time of the subsequent message.

5. The network interface mechanism of claim 4 wherein the transmission delay compensation estimator determines the transmission time compensation value for the subsequent message by weighing a measured transmission delay for the first message and adding a weighted value of a transmission time compensation value for the first message.

6. The network interface mechanism of claim 1 wherein the transmission controller further disables the network transmitter at a transmission cut off time.

7. A network interface mechanism, the network interface mechanism comprising:
   a) a transmitter, the transmitter coupled to a bus;
   an Ethernet controller, the Ethernet controller receiving message data and selectively passing the message data to the transmitter for transmission on the bus;
   c) a message detector, the message detector coupled to the bus to determine an arrival time of a feedback signal signifying a transmitted time instance of a first message transmitted on the bus by the transmitter; and
   d) a transmission controller, the transmission controller controlling the transmitter and the Ethernet controller to adjust a transmission time of a subsequent message by the transmitter in response to the determined arrival time of the feedback signal.

8. The network interface mechanism of claim 7 wherein the transmission controller further disables the transmitter at an end of a time slot for the subsequent message.

9. The network interface mechanism of claim 7 wherein the transmission controller controls the Ethernet controller by selectively controlling timing of loading message data from a data buffer to the Ethernet controller.

10. The network interface mechanism of claim 7 further comprising a transmission delay compensation estimator, the transmission delay compensation estimator receiving the arrival time of the feedback signal from the message detector and determining a transmission time compensation value for adjusting the transmission time of the subsequent message.

11. The network interface mechanism of claim 10 wherein the transmission delay compensation estimator determines the transmission time compensation value for the subsequent message by weighing a measured transmission delay in the first message transmission and a weighted value of a transmission time compensation value for the first message.

12. The network interface mechanism of claim 7 further comprising a transmission scheduler, the transmission scheduler including a transmission schedule for the network interface mechanism.

13. The network interface mechanism of claim 7 wherein the network interface mechanism provides precision timing control and facilitates TDMA communication protocol application.

14. A method of transmitting messages on a bus, the method comprising the steps of:
   a) receiving a first message transmitted by a network transmitter and determining an arrival time of a feedback signal signifying a transmitted time instance of the first message;
   b) adjusting a transmission time of a subsequent message by the network transmitter in response to the determined arrival time of the feedback signal; and
   c) transmitting the subsequent message at the adjusted transmission time.

15. The method of claim 14 wherein the step of receiving the first message transmitted by a network transmitter and determining the arrival time of the feedback signal comprises latching the transmission time of the first message and determining if the first message is of a selected type.

16. The method of claim 14 wherein the step of adjusting a transmission time of a subsequent message by the network transmitter in response to the determined arrival time of the feedback signal comprises determining a compensation value for adjusting the transmission time of the subsequent message.

17. The method of claim 16 wherein the step of adjusting a transmission time of a subsequent message by the network transmitter in response to the determined arrival time of the feedback signal further comprises determining the compensation value by weighing a measured transmission delay of the first message and adding a weighted value of a transmission time compensation value for the first message.

18. The method of claim 14 wherein the step of transmitting the subsequent message at the adjusted transmission time comprises loading subsequent message data from an Ethernet controller to the transmitter and enabling the transmitter.

19. The method of claim 18 further comprising the step of disabling the transmitter after a timeslot for the first message has ended and disabling the transmitter after a timeslot for the subsequent message has ended.

\* \* \* \* \*

UNITED STATES PATENT AND TRADEMARK OFFICE
CERTIFICATE OF CORRECTION

PATENT NO. : 7,668,092 B2  Page 1 of 1
APPLICATION NO. : 10/302336
DATED : February 23, 2010
INVENTOR(S) : Chiu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2196 days.

Signed and Sealed this

Seventh Day of December, 2010

David J. Kappos
*Director of the United States Patent and Trademark Office*